(12) United States Patent
Miyamoto

(10) Patent No.: US 9,534,282 B2
(45) Date of Patent: Jan. 3, 2017

(54) METHOD FOR MANUFACTURING ALUMINUM BASED ALLOY-MADE FASTENING PART AND ALUMINUM BASED ALLOY-MADE FASTENING PART

(75) Inventor: Kouhei Miyamoto, Hadano (JP)

(73) Assignee: TOPURA CO., LTD., Hadano-shi, Kanagawa (JP)

( * ) Notice: Subject to any disclaimer, the term of this patent is extended or adjusted under 35 U.S.C. 154(b) by 681 days.

(21) Appl. No.: 13/883,642

(22) PCT Filed: Nov. 10, 2011

(86) PCT No.: PCT/JP2011/075941
§ 371 (c)(1),
(2), (4) Date: May 6, 2013

(87) PCT Pub. No.: WO2012/063900
PCT Pub. Date: May 18, 2012

(65) Prior Publication Data
US 2013/0230366 A1     Sep. 5, 2013

(30) Foreign Application Priority Data

Nov. 10, 2010  (JP) ................. 2010-251610

(51) Int. Cl.
| | | |
|---|---|---|
| C22F 1/04 | (2006.01) |
| B21H 3/02 | (2006.01) |
| B21K 1/46 | (2006.01) |
| F16B 33/00 | (2006.01) |
| B23G 5/00 | (2006.01) |
| F16B 35/00 | (2006.01) |
| C22F 1/05 | (2006.01) |

(52) U.S. Cl.
CPC . *C22F 1/04* (2013.01); *B21H 3/02* (2013.01); *B21K 1/46* (2013.01); *B23G 5/00* (2013.01); *C22F 1/05* (2013.01); *F16B 33/008* (2013.01); *F16B 35/00* (2013.01)

(58) Field of Classification Search
CPC ................ C22F 1/04; B21H 3/02; B21K 1/46; B23G 5/00; F16B 33/08; F16B 33/00; F16B 35/00
See application file for complete search history.

(56) References Cited

U.S. PATENT DOCUMENTS

| | | |
|---|---|---|
| 5,922,472 A | 7/1999 | Keener |
| 6,221,177 B1 | 4/2001 | Keener |
| 6,403,230 B1 | 6/2002 | Keener |

(Continued)

FOREIGN PATENT DOCUMENTS

| | | |
|---|---|---|
| CN | 1307938 A | 8/2001 |
| EP | 0863220 A1 | 9/1998 |

(Continued)

*Primary Examiner* — Roy King
*Assistant Examiner* — Janelle Morillo
(74) *Attorney, Agent, or Firm* — Harness, Dickey & Pierce, P.L.C.

(57) ABSTRACT

By changing the timing of applying a heat treatment, a high-strength aluminum based alloy-made fastening part having an unprecedented tensile strength or other strength property and a method for manufacturing of the same are provided. The method is characterized in that an aluminum based alloy-made material is subjected to a solution treatment and is then age-hardened; work hardening is further applied to a shaft portion by drawing thereof in a heading process; and the shaft portion is thereafter subjected to a process of rolling male threads.

1 Claim, 3 Drawing Sheets

(56) References Cited

U.S. PATENT DOCUMENTS

| | | |
|---|---|---|
| 7,198,246 B2 | 4/2007 | Liew |
| 2004/0253341 A1 | 12/2004 | Liew |
| 2010/0089503 A1 | 4/2010 | Inagaki et al. |

FOREIGN PATENT DOCUMENTS

| | | |
|---|---|---|
| JP | 49-079355 A1 | 7/1974 |
| JP | 57-181739 A1 | 11/1982 |
| JP | S63-174749 A | 7/1988 |
| JP | 01-099740 A1 | 4/1989 |
| JP | 06-185512 A1 | 7/1994 |
| JP | 08-309472 A1 | 11/1996 |
| JP | 09-143552 A1 | 6/1997 |
| JP | 09-314276 A1 | 12/1997 |
| JP | 11-172359 A1 | 6/1999 |
| JP | 2006-057123 A | 3/2006 |
| JP | 3939414 B2 | 7/2007 |
| JP | 2007-284731 A1 | 11/2007 |
| JP | 2008-223108 Al | 9/2008 |
| JP | 2010-189750 A1 | 9/2010 |
| JP | 2010-236665 A | 10/2010 |
| TW | 200427560 A | 12/2004 |
| WO | 96/34993 A1 | 11/1996 |

MEASUREMENT PART

METHOD FOR MANUFACTURING ALUMINUM BASED ALLOY-MADE FASTENING PART AND ALUMINUM BASED ALLOY-MADE FASTENING PART

CROSS-REFERENCE TO RELATED APPLICATIONS

This application is a National Stage of International Application No. PCT/JP2011/075941, filed Nov. 10, 2011, which claims priority to Japanese Application No. 2010-251610, filed Nov. 10, 2010. The entire disclosures of each of the above applications are incorporated herein by reference.

FIELD

The present disclosure relates to a method for manufacturing an aluminum based alloy-made fastening part that has superior durability and high strength, and to the aluminum based alloy-made fastening part.

BACKGROUND

Hitherto, a main material used in an automobile industry has been steel. However, movements associated with energy saving have been stepped up all across the world, and there is a tendency of demand for further weight reduction of vehicles. The weight reduction is planned not only for a vehicle itself but also for the parts constituting thereof and fastening parts including bolts.

As regards steel bolts, the size thereof has been reduced by enhancing the strength, and the weight reduction has been promoted through a means of reducing the number of pieces involved; however, even though the number of pieces involved is suppressed to a required minimum, further weight reduction has been difficult to be realized since the specific gravity of the material itself is large.

Moreover, in a trend of rendering constituent parts of a vehicle to be of aluminum, usage in combination with steel-made bolts brings about fears of a cave-in of an aluminum material due to the difference in thermal expansion coefficients and of development of corrosive deterioration due to contact of dissimilar metals, and also brings about a problem of requiring the number of man-hours for separation at the recycling stage. Accordingly, an aluminum based alloy-made bolt (hereinafter, referred to as "aluminum alloy bolt") having high strength is demanded.

In the case of making an aluminum alloy bolt highly strengthened, it has hitherto been common to condition it to have predetermined strength through implementation of a solution treatment and an ageing treatment as described in Patent Literature 1. Since the aluminum alloy bolt is apt to suffer a crack due to stress corrosion with enhancing in strength, overage thermal refining by which the strength is lowered by 5 to 15% from the maximum strength is generally utilized.

The method described in Patent Literature 1 is to apply a heat treatment, which includes quenching from a temperature exceeding 480° C. and an ageing treatment within the range between +60° C. and 220° C., after being formed into a bolt shape through cold heading.

Likewise, as regards Patent Literatures 2 to 4, a heat treatment for enhancing strength is to be applied after a shaping process as with Patent Literature 1.

CITATION LIST

Patent Literature

Patent Literature 1: Japanese Patent No. 3939414
Patent Literature 2: Japanese Patent Application Laid-Open No. Hei 6-185512
Patent Literature 3: Japanese Patent Application Laid-Open No. Hei 11-172359
Patent Literature 4: Japanese Patent Application Laid-Open No. Hei 8-309472
Patent Literature 5: Japanese Patent Application Laid-Open No. Hei 9-314276

SUMMARY

Technical Problem

However, the tensile strength according to the method in which a heat treatment is applied after the process of shaping into a bolt is limited within the range described in JIS B 1057. From the aspect of practical bounds, the limit of tensile strength is to be 565 to 570 MPa and the limit of proof stress is to be 505 to 515 MPa, which are described in Journal of Japan Research Institute for Screw Threads and Fasteners, Vol. 25, No. 9 (1994). In the case of an aluminum alloy bolt, since such a problem arises that respecting the strength brings about a reduction in the toughness, the material and/or heat treatment are required to be changed as necessary.

Because of such problems, as regards the aluminum alloy bolt, the technique of allowing enhancement of tensile strength and prevention of reduction in toughness to be mutually compatible as with a steel-made bolt fabricated through thermal refining is not yet established.

In addition, the aluminum alloy bolt causes the crystal grain to become coarse, when provided with a small work strain, due to the heat treatment for enhancing the strength, which brings about a problem that desired strength cannot be obtained. A process in which the conditions of the work strain are taken into account should be implemented.

The present disclosure has been conducted to solve the problems with conventional techniques described above. What the disclosure aims at is to provide a method for manufacturing an aluminum based alloy-made fastening part, which has an unprecedented tensile property and other strength properties, and the aluminum based alloy-made fastening part by way of changing the timing of applying a heat treatment during the manufacturing process.

Solution to Problem

To solve the above problems, the method for manufacturing an aluminum based alloy-made fastening part of the present disclosure is characterized in that strength is enhanced by applying a heat treatment to a material made of an aluminum based alloy, and then the strength is further enhanced through work hardening when deforming the material into a predetermined shape in a heading process.

In the case of being applied to one, which has a shaft portion subjected to a tensile force when fastened, such as a bolt or another male thread part, a rivet, or the like as a fastening part, the shaft portion is subjected to drawing processing in the heading process.

In the case in which the fastening part is a male thread part, the shaft portion is subjected to a process of rolling threads after the shaft portion has been subjected to drawing processing.

The heat treatment is to implement a solution treatment and then to implement an ageing treatment; thermal refining is conducted after the constitution of the aluminum alloy material has once been reset.

The heading process is preferable to be cold forging.

The aluminum based alloy-made fastening part of the present disclosure is an aluminum based alloy-made fastening part provided with a fastening shaft portion, to which a tensile force is applied when fastened, such as a bolt or another male thread part, a rivet, or the like. The shaft portion has a configuration that an aluminum based alloy-made mold material, the strength of which is enhanced through a heat treatment, is forged by drawing processing. The shaft portion also has such hardness distribution in which the hardness becomes larger gradually from a surface up to a specified depth as hysteresis of work hardening due to the drawing processing.

Advantageous Effects of the Disclosure

According to the present disclosure, the work hardening is added through deformation into a shape of a fastening part in a heading process in addition to that the strength has been enhanced through heat treatment processes such as a solution treatment, an ageing treatment, and the like. Accordingly, it becomes possible to manufacture an aluminum based alloy-made fastening part having a higher tensile property as compared with the method of implementing a heat treatment after the process of shaping into a fastening part as before.

Particularly, if the fastening part is shaped by cold forging at the heading process, large equipment as with hot processing is not necessary, which results in a lower cost.

DRAWINGS

FIGS. 1(A) to 1(H) are drawings showing processes for manufacturing an aluminum alloy bolt, being the aluminum based alloy-made fastening part, according to an embodiment of the present disclosure.

Figure 1:
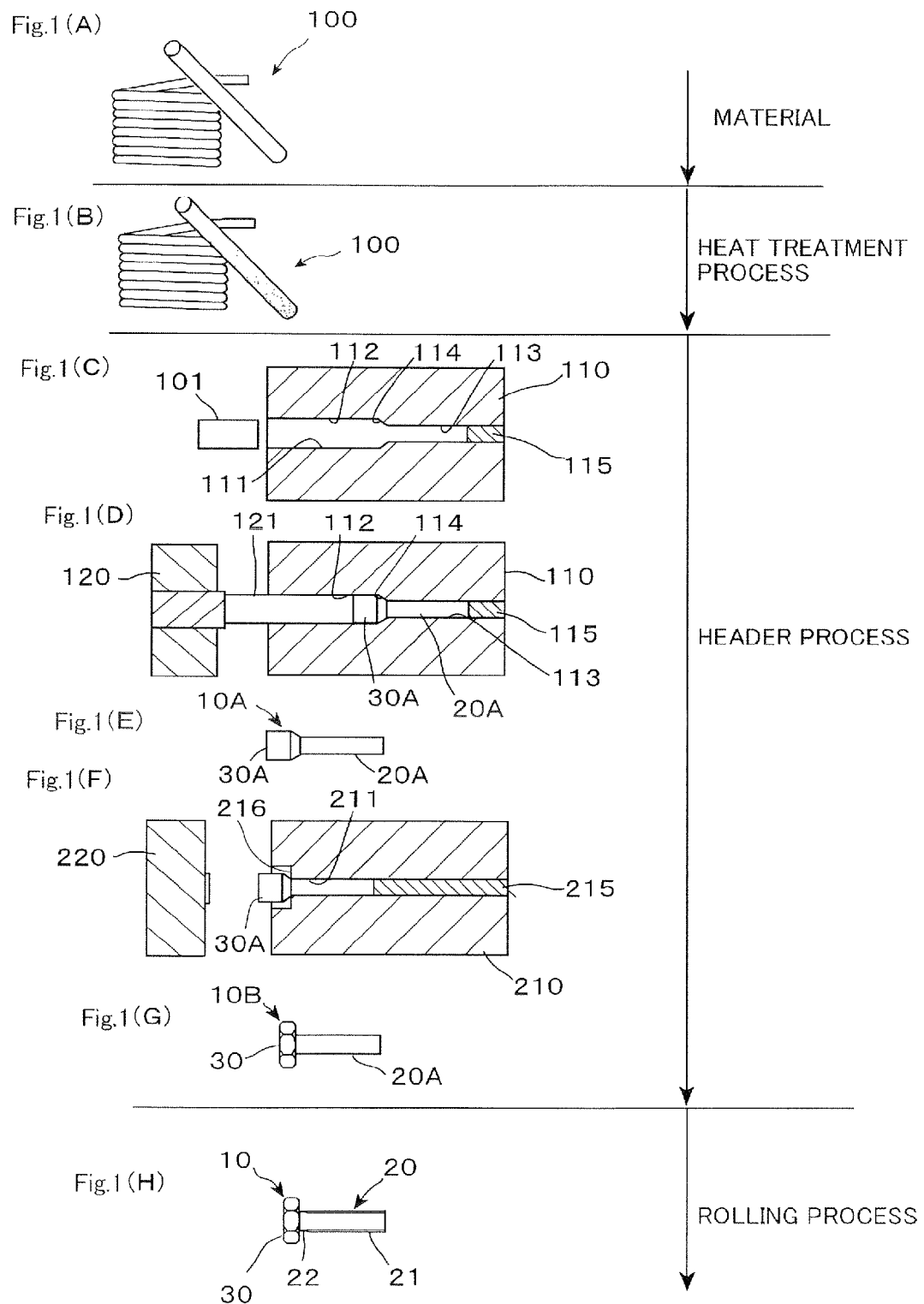

FIGS. 3(A) to 3(D) are ones showing the relationship between the distance from the surface of the shaft portion and the hardness of the aluminum alloy bolt of FIGS. 1; 3(A) is a graph showing hardness distribution of the neck portion, and 3(B) is a graph showing hardness distribution of the thread portion.

DETAILED DESCRIPTION

The present disclosure will be described below in detail on the basis of the embodiment shown in the drawings.

FIGS. 1(A) to 1(H) show processes of manufacturing an aluminum alloy bolt, being the aluminum based alloy-made male thread member, according to an embodiment of the present disclosure.

Figure 2:
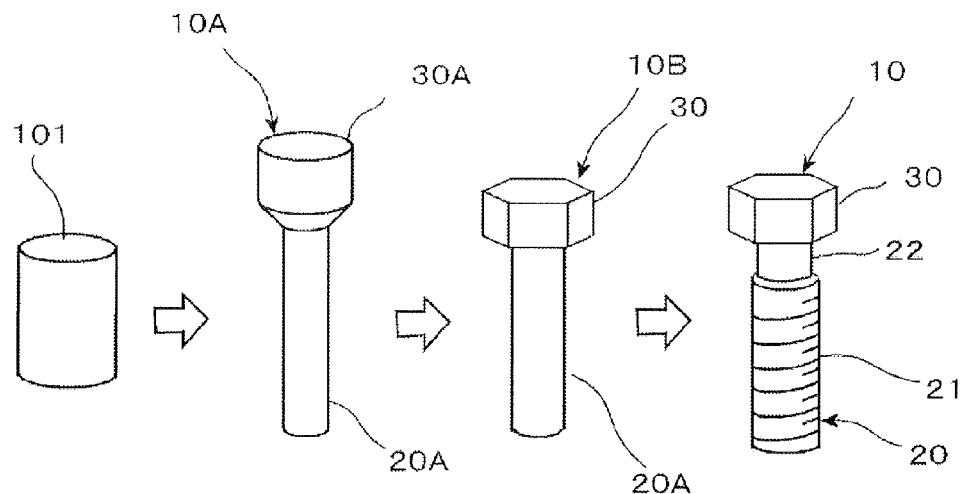
FIG. 2(A) is a drawing showing the change in work profiles from a material to a product in the manufacturing processes of FIGS. 1(A) to 1(H).
FIG. 2(B) is a graph showing the relationship between the drawing ratio and the tensile strength of the aluminum alloy bolt manufactured through the method shown in FIGS. 1(A) to 1(H).
Figure 2:
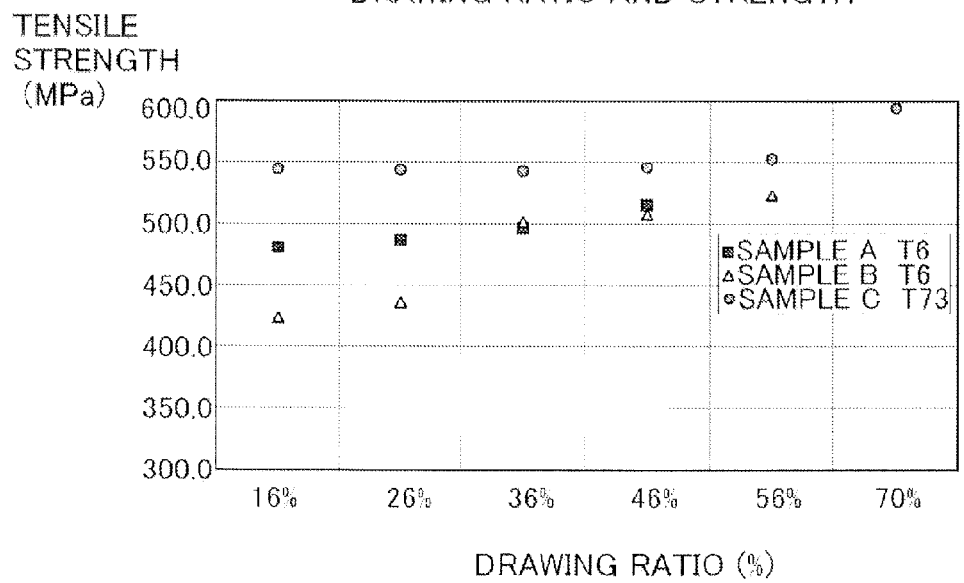

This aluminum alloy bolt 10 has a shaft portion 20 and a head portion 30 provided on one end of the shaft portion 20 as shown in FIGS. 1(H) and 2(A), and the shaft portion 20 is provided with a thread portion 21 having male threads formed thereon by a predetermined length from the top end toward the head portion 30 and an unthreaded neck portion 22 between the thread portion 21 and the head portion 30. Although the head portion is rendered to have a typical hexagonal shape in the drawings, the shape thereof may not be limited to be hexagonal, but the head portion may be irrespective of the shape and structure.

An aluminum based alloy-made material is provided as a wire-shaped or rod-shaped wire material 100 as shown in FIG. 1(A).

Although alloys of 6000 series being AL-Mg—Si series alloys, and 7000 series being Al—Mg—Zn series alloys are used as the aluminum alloy, any alloy is applicable so long as it can be thermally refined through a heat treatment. For example, 2000 series being Al—Cu series alloys may also be applied.

This wire material 100 of an aluminum based alloy material is subjected to a heat treatment.

As the heat treatment, a solution treatment is implemented and followed by an ageing treatment.

The treatment applied to the 6000 series is T6; the solution treatment is within a range between 515° C. and 550° C., the quenching is of water-cooled, and the ageing treatment is within a range between 170° C. and 180° C. for approximately 8 Hrs.

The treatment applied to the 7000 series is T73; the solution treatment is within a range between 460° C. and 475° C., the quenching is of water-cooled, and the ageing treatment is within a range between 110° C. and 115° C. for approximately 6 to 8 Hrs and within a range between 175° C. and 180° C. for approximately 6 to 10 Hrs.

These heat treatment conditions are of a common treatment and any particular temperature control is not necessary.

Then, as shown in FIGS. 1(C) to 1(G), a wire material undergone a heat treatment is cut into a unit wire material 101 having a predetermined length corresponding to one piece of bolt, and proceeds to the heading process.

The solution treatment and the ageing treatment may be implemented after the wire material having been cut into the unit wire material 101.

The heading process is all conducted through cold forging.

First, as shown in FIGS. 1(C) to 1(E), this unit wire material 101 is inserted into a first molding die 110, which is provided with a knock-out pin 115 at a predetermined position in advance, and formed into a first header blank 10A, being an intermediate molded body at the first step, by being subjected to closed drawing processing with a first punch pin 121.

The first header blank 10A is configured to have a half-formed head portion 30A becoming the screw head portion 30 and a half-formed shaft portion 20A becoming the screw shaft portion 20, as shown in FIGS. 1(C) and 2(A).

In the first molding die 110, a stepped die hole 111 is through-formed. The die hole 111 is provided with a large-diameter hole 112 corresponding to the wire diameter of the unit wire material, a small-diameter hole 113 having a smaller diameter as compared with the large-diameter hole 112, and a stepped portion 114 at the boundary between the large-diameter hole 112 and the small-diameter hole 113. The stepped portion 114 is configured to have a tapered shape, the diameter of which becomes gradually smaller toward the small-diameter hole 113.

The unit wire material 101 is inserted into the large-diameter hole 112 of the first molding die 110, and is pushed in by the first punch pin 121 of a first punch 120 disposed to oppose to the first molding die 110. The unit wire material 101 enters on the side of the small-diameter hole 113 as being drawn at the stepped portion 114 to have a small diameter, comes into contact with the knock-out pin 115 having been inserted into the small-diameter hole 113, and is compressed in between the first punch pin 121 and the knock-out pin 115; the first header blank 10A is formed.

By the forming process, the portion pressed into the small-diameter hole 113 is rendered to be the half-formed shaft portion 20A and the portion remaining in the large-diameter hole 112 is rendered to be the half-formed head portion 30A.

Next, a second header blank 10B, being an intermediate molded body at the second step, is formed by means of a second molding die 210 and a second punch 220 for upsetting as shown in FIGS. 1(F) and 1(G). The second header blank 10B is formed into the head portion 30 having the ultimate shape as shown in FIGS. 1(G) and 2(A).

In the second molding die 210, a die hole 211 and a upsetting recessed portion 216 are provided as shown in FIG. 1(F). The die hole 211 is a round hole having the same diameter as that of the half-formed shaft portion 20A, and is provided with a knock-out pin 215 at a predetermined position in advance. The half-formed shaft portion 20A of the first header blank 10A is inserted into this die hole 211, the top end thereof is brought to come into contact with the knock-out pin 215, and the half-formed head portion 30A is held in a state of protruding from an opening portion of the die hole 211.

On the other hand, the upsetting recessed portion 216 has a shape following the shape of the head portion 30 of the aluminum alloy bolt 10 being the final molded product. The half-formed head portion 30A is brought to enter up to a midpoint thereof and is press-crushed by the second punch 220 to be formed into a shape following the inner periphery shape of the upsetting recessed portion 216.

Accordingly, the second header blank 10B provided with the half-formed shaft portion 20A before thread molding and the head portion 30 is formed.

Then, the half-formed shaft portion 20A is subjected to male thread rolling for a predetermined length from the top end thereof by use of a roll die (not illustrated) for providing the thread portion 21. The aluminum alloy bolt 10, being the final product, is thereby completed as shown in FIG. 1(H).

Since work hardening is further applied through drawing of the shaft portion 20 in the process of cold heading in addition to enhancement of the strength through the solution treatment and the ageing treatment, the aluminum alloy bolt 10 formed like this can be rendered to have a more enhanced tensile property as compared to an aluminum alloy bolt 10 according to the conventional method in which a heat treatment is applied thereto after the process of shaping into the bolt. Particularly, since the bolt is formed by cold forging, large equipment as with hot processing is not necessary, which results in a lower cost.

Table 1 shows the results of a test that was conducted by manufacturing plural samples, the shaft portions of which have different drawing ratios with each other, from different aluminum based alloys and by measuring the tensile strength and the proof stress of each of the plural samples.

As the aluminum based alloys, two kinds of sample A and sample B were taken from 6000 series, and sample C was taken from 7000 series.

The aluminum based alloy wire materials were thermally refined through a solution treatment and by undergoing age-hardening.

The temperature conditions of the solution treatment are as follows. As to the sample A, the solution treatment temperature was 550° C., the quenching was of water-cooled, and the ageing treatment was at 170° C. for 15 Hrs. As to the sample B, the solution treatment temperature was 550° C., the quenching was of water-cooled, and the ageing treatment was at 170° C. for 6 Hrs.

The drawing ratios, which each represent the area ratio of the cross sectional area of the unit wire material being a raw material versus the cross sectional area of the shaft portion, were 6 patterns of 16%, 26%, 36%, 46%, 56% and 70%. The diameters of shaft portions were φ7.10 to 7.13 mm, and the diameter of unit wire materials employed became larger with increasing drawing ratios.

TABLE 1

| | DRAWING RATIO | | | | | |
|---|---|---|---|---|---|---|
| | DRAWING RATIO: 16% | | DRAWING RATIO: 26% | | DRAWING RATIO: 36% | |
| | ITEM | | | | | |
| MATERIAL | TENSILE STRENGTH MPa | PROOF STRESS MPa | TENSILE STRENGTH MPa | PROOF STRESS MPa | TENSILE STRENGTH MPa | PROOF STRESS MPa |
| ① SAMPLE A | 480.81 | 417.84 | 486.06 | 465.30 | 496.46 | 480.01 |
| ② SAMPLE B | 424.91 | 411.12 | 435.76 | 421.44 | 501.45 | 486.08 |
| ③ SAMPLE C | 544.42 | 509.16 | 543.56 | 514.17 | 542.77 | 532.19 |

| | DRAWING RATIO | | | | | |
|---|---|---|---|---|---|---|
| | DRAWING RATIO: 46% | | DRAWING RATIO: 56% | | DRAWING RATIO: 70% | |
| | ITEM | | | | | |
| MATERIAL | TENSILE STRENGTH MPa | PROOF STRESS MPa | TENSILE STRENGTH MPa | PROOF STRESS MPa | TENSILE STRENGTH MPa | PROOF STRESS MPa |
| ① SAMPLE A | 515.11 | 495.39 | | | | |
| ② SAMPLE B | 507.26 | 493.98 | 523.35 | 517.16 | | |
| ③ SAMPLE C | 545.79 | 532.19 | 552.44 | 539.65 | 593.89 | 563.20 |

FIG. 2(B) is a graph showing the data of the above Table 1 by plotting the drawing ratio on the horizontal axis and the tensile strength on the vertical axis.

As shown in the table, the tensile strength equal to or more than 500 MPa was attained by any of the sample A, sample B and sample C although depending on the drawing ratio.

In regard to the drawing ratio, the order of 16% to 70% is desirable; if exceeding 70%, there is a risk of occurrence of a crack or the like; and if being less than 16%, the effect of strength enhancement due to work hardening becomes small. Particularly, if being equal to or more than 36%, 500 MPa or more can be attained.

Moreover, such a structural feature was confirmed that such a hardness distribution in which hardness became larger gradually from the surface up to a specified depth as the hysteresis of work hardening due to the drawing processing had been formed in the shaft portion.

Since the surface side is thus soft, the cohesiveness of the contact surface of a thread ridge becomes better when fastened.

Figure 3A:
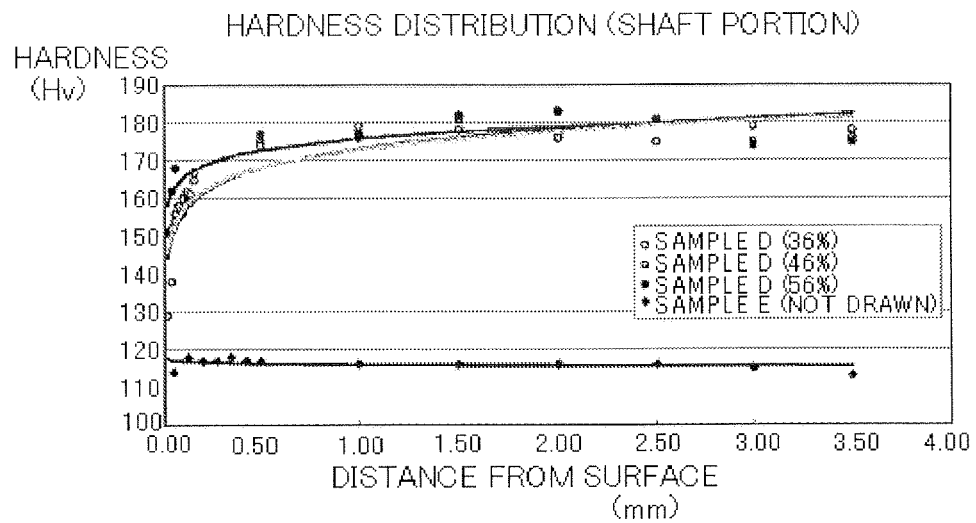
Figure 3B:

FIGS. 3(A) to 3(D) show the hardness distributions of plural pieces of the sample D of the present disclosure, which are aluminum alloy bolts of A6000 series and have drawing ratios of 36%, 46%, and 56%, respectively, and of a comparable sample E, which is an undrawn ordinary one, as to the unthreaded neck portion 22 and the thread portion 21 having threads formed thereon as shown in FIG. 3(B), by plotting the distance from the surface on the horizontal axis and the hardness (Hv) on the vertical axis.

FIG. 3(A) shows the hardness distribution as to the neck portion 22. The diameter of the neck portion 22 of each of the samples was 7 mm, and the hardness distribution was measured up to the center position (the distance from the surface was 3.5 mm).

As to the neck portion, in the case of the samples D of the present disclosure, such a tendency was exhibited that the hardness steeply rose from 130 Hv to the order of 170 Hv in the span from 0 to the order of 0.5 mm, and gradually rose from 170 Hv to the order of 180 Hv in the depth equal thereto or more until reaching 3.5 mm at the center position.

On the other hand, in the case of the undrawn comparable sample E, the hardness was constant at 110 to the order of 120 Hv even though the depth was altered.

Figure 3C:
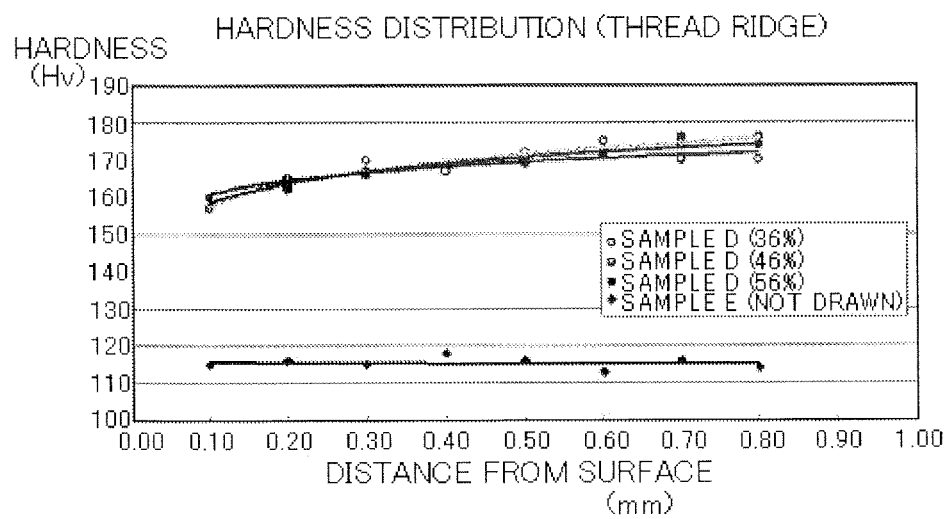
Figure 3D:
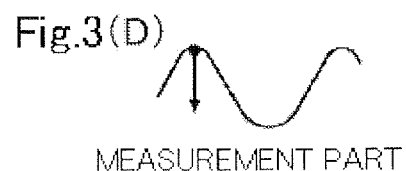

As to the thread portion 21 having threads formed thereon, the measurement was conducted by rendering the crest of thread as zero as shown in FIG. 3(D). As shown in FIG. 3(C), since the measurement at the crest of thread was not possible, the hardness was measured from the depth of the order of 0.1 mm; the hardness however was the order of 160 Hv even at the depth of 0.1 mm since the portion of thread ridges was subjected to work hardening in a rolling process, and such a distribution was exhibited in which the hardness gradually rose even the depth became deeper.

As can be seen from the results, as to the unthreaded neck portion 22 of the shaft portion 20, since the hardness at the surface is low as compared with that at a deep place, thread rolling can be easily carried out even when the shaft portion is rendered to have high strength by being drawn.

As described above, since an aluminum alloy bolt 10 having a high tensile property can be attained according to the present disclosure, ripple effects are exerted as follows.

1. Weight Reduction

It becomes possible to use the high strength aluminum alloy bolt of the present disclosure even for the fastened members for which a high fastening force is required and a steel-made bolt have hitherto been used. Since the density of the raw material of aluminum based alloys is 2.71 (g/cm$^3$) with respect to 7.85 (g/cm$^3$) of steel, the specific gravity becomes approximately ⅓ as compared with steel, by which weight reduction can be brought about.

2. Prevention of Bolt Looseness Due to the Difference Between Thermal Expansion Coefficients In the case in which fastened members are of aluminum based alloys, usage of a steel-made bolt may cause a risk in which the load on the bolt side becomes larger with increase in temperatures because of the difference between the thermal expansion coefficients of the aluminum based alloy and steel, and the fastened members may suffer depressed deformation in some instances, and looseness may thereby arise. Conversely, usage of the high strength aluminum alloy bolt, which can respond to a high fastening force, of the disclosure of the subject application enables to prevent it through equalizing of the thermal expansion coefficients.

3. Prevention of Potential Difference Corrosion Due to the Contact of Dissimilar Metals In the case in which fastened members are of aluminum based alloys, if aluminum is brought to come into contact with magnesium or iron, the aluminum side erodes due to potential difference corrosion and the fastened member side may suffer depressed deformation in some instances, and looseness may thereby arise. Usage of the high strength aluminum alloy bolt, which can respond to a high fastening force, of the present disclosure enables to eliminate the potential difference between the dissimilar metals and to prevent the corrosion due to the potential difference.

4. Promotion of Recycling

Hitherto, in the case in which fastened members are aluminum based alloys and steel-made bolts are used, man-hours for separation have been needed at the occasion of recycling. In contrast thereto, by using the high strength aluminum alloy bolts, which can respond to a high fastening force, of the present disclosure, the material can be made common with that of the fastened members and the cutting of man-hours for separation is enabled.

Incidentally, although an explanation was given by taking an aluminum alloy bolt as an example of the aluminum based alloy-made fastening part in the above embodiment, the application is not limited to the bolt, but may be accorded to an aluminum based alloy-made male thread part, on the shaft portion of which male threads are formed, in general.

Likewise, the application may also be accorded to a rivet as a fastening part, to which a tensile force is applied when fastened, as with the male thread part.

The rivet has the shape of the second header blank in FIG. 1 in principle, and does not need a rolling process for threading thereon.

Moreover, the application may also be accorded to a nut, which makes a pair with a bolt, as the fastening part. As to manufacturing of the nut, although having no shaft portion as distinct from the bolt and the rivet, it may be possible, for example, to enhance the strength by applying a heat treatment to the raw material before a heading process such as upsetting work or the like, and then to attain further enhancement of the strength by utilizing work hardening in the heading process.

REFERENCE SIGNS LIST

10 Aluminum alloy bolt (Aluminum based alloy-made fastening part)
10A First header blank
10B Second header blank
20 Shaft portion
20A Half-formed shaft portion

30 Head portion
30A Half-formed head portion
100 Wire material
101 Unit wire material
110 First molding die
111 Die hole
112 Large-diameter hole
113 Small-diameter hole
114 Stepped portion
115 Knock-out pin
120 First punch
121 First punch pin
125 Knock-out pin
210 Second molding die
211 Die hole
215 Knock-out pin
220 Second punch

The invention claimed is:

1. An aluminum alloy bolt made of an aluminum based alloy of 6000 series, having a shaft with a threaded portion, wherein the shaft has a tensile strength being equal to or more than 500 MPa and has a hardness distribution such that the hardness steeply rises from approximately 130 Hv at a surface to the order of approximately 170 Hv in the span from 0 to a distance of 0.5 mm from the surface, and then gradually rises from approximately 170 Hv to the order of approximately 180 Hv until reaching a center position of the shaft, and a hardness of the thread portion has a hardness distribution such that the hardness is on the order of 160 Hv at a depth of 0.1 mm.

* * * * *